March 3, 1959 B. N. INMAN 2,876,066
PRODUCTION OF METALLIC CYANIDES
Filed Oct. 17, 1955
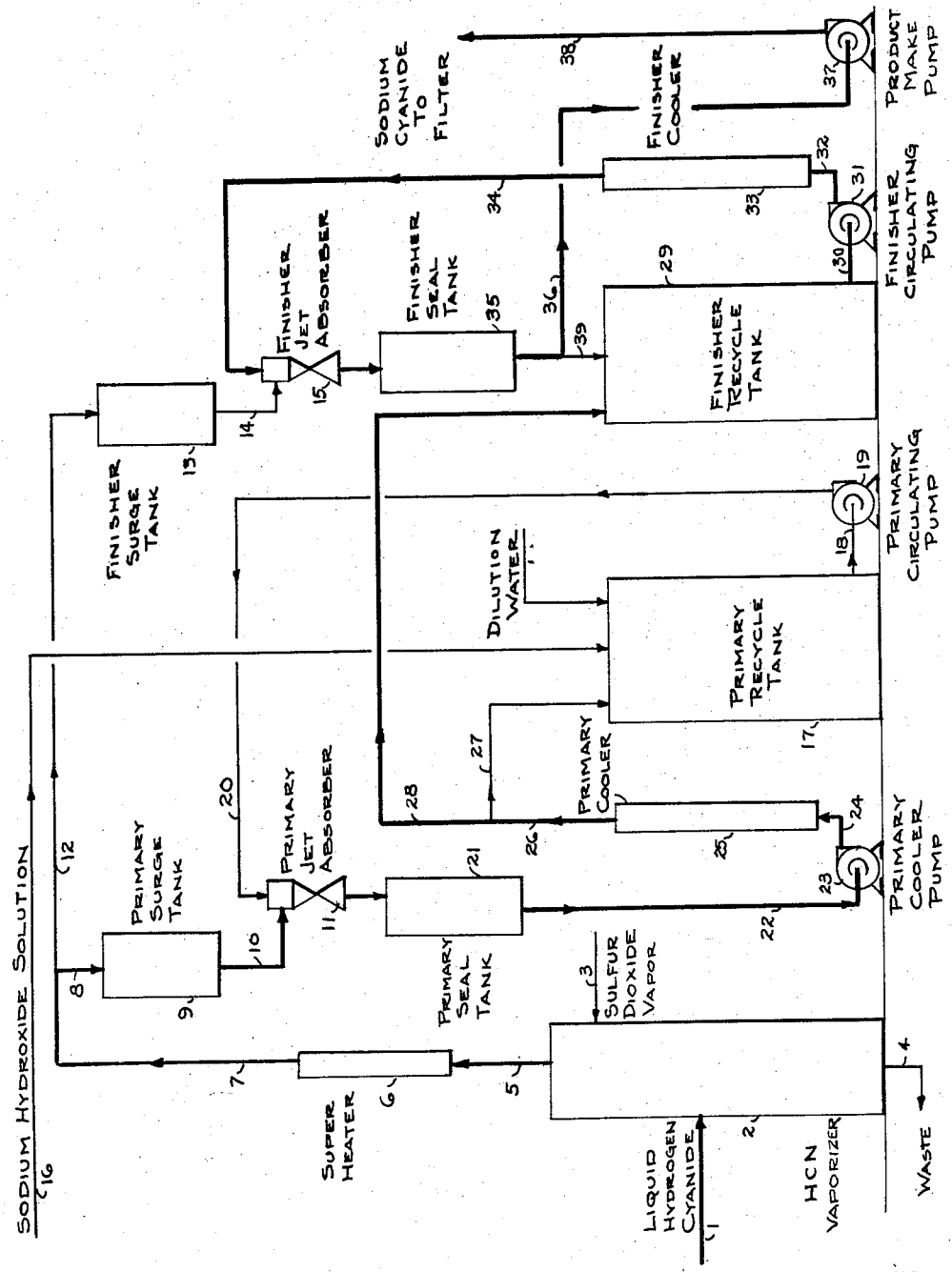
INVENTOR.
BYRON N. INMAN
BY
AGENT

United States Patent Office

2,876,066
Patented Mar. 3, 1959

2,876,066

PRODUCTION OF METALLIC CYANIDES

Byron N. Inman, Tonawanda, N. Y., assignor to E. I. du Pont de Nemours and Company, Wilmington, Del., a corporation of Delaware Application October 17, 1955, Serial No. 540,708

6 Claims. (Cl. 23—79)

This invention relates to the manufacture of metallic cyanides and more particularly to the manufacture of sodium or potassium cyanide in the wet way, that is, by the neutralization of an aqueous solution of caustic soda or caustic potash by means of hydrogen cyanide.

This application is a continuation-in-part of my co-pending application Serial Number 342,700, filed March 16, 1953, and now abandoned.

It has been proposed heretofore to manufacture sodium cyanide by various wet processes. Thus Roessler U. S. P. 716,350 (1902) merely passes gases containing hydrocyanic acid through concentrated caustic solutions. Tscherniac U. S. P. 781,472 (1905) shows much the same method. Despite the age of the known art, commercial processes utilizing such methods have not been very successful. Some of the lack of success may have been economic with the cost of hydrogen cyanide being prohibitive. Another factor, however, that has played a large part in retarding industrial exploitation of the wet processes has been the number of technological difficulties encountered therein. These difficulties have been largely due to the tendency of the cyanides generally and of hydrogen cyanide especially to decompose or to form colored polymers.

With the advent of the catalytic processes for making hydrocyanic acid, including those of Andrussow U. S. P. 1,934,838 and Lacy U. S. P. 2,076,953, this acid has been in more abundant supply. The economic detriment to the wet processes has thus to some extent been diminished. The technological difficulties still remain. Some of the expedients heretofore proposed to avoid these difficulties involve, e. g., the use of suspended lime to permit the making of a product containing over 90% sodium cyanide (U. S. P. 2,616,782); the use of ammonia to precipitate undesired by-product salts (U. S. P. 1,531,123); and the use of caustic soda in crystal form in very little water (A. P. C. publication S. N. 339,015). The present invention avoids all such complicated and uneconomic expedients. A primary object of the present invention is therefore development of a novel process for producing substantially pure alkali metal cyanide by the interaction between hydrogen cyanide and an alkali metal hydroxide. A further object is development of a novel and useful process for making substantially pure sodium cyanide by interacting hydrogen cyanide and sodium hydroxide in aqueous solution, and subsequently separating sodium cyanide from the solution. The over-all objective is the invention of a wet process which will permit the production of a solid stable product of high quality containing at least 96% sodium cyanide.

These and other objectives may be achieved by a process in which a continuous stream of hydrocyanic acid gas is converted to sodium cyanide by quick and intimate intermixture with a continuous stream of an aqueous solution containing a minor portion of sodium hydroxide and a major portion of sodium cyanide. The amount of hydrocyanic gas intermixed with the liquid stream must be such that the heat of neutralization will not raise the temperature of the aqueous stream above about 50° C. and the aqueous stream must contain enough sodium hydroxide so that after the neutralization of the hydrocyanic acid gas the resultant liquid sodium cyanide solution will contain an excess of at least 0.2% by weight of free or unreacted sodium hydroxide and it may contain between about 0.5 to 3.5% by weight if further neutralized in a second stage. It is important that the quantity of hydrocyanic acid intermixed with the aqueous solution will at no time neutralize all of the sodium hydroxide present and that preferably a final concentration of up to at least 0.5% by weight of sodium hydroxide remain unneutralized and that at all times during the entire reaction cycle there be an excess of caustic over acid in the cyanide solution. It is equally important that the aqueous solution containing sodium cyanide and sodium hydroxide at no time during the reaction cycle be permittted to exceed a temperature of about 50° C. and this is accomplished by intermixing the liquid stream to be reacted with the hydrocyanic acid at a temperature not below about 35° C. and preferably not above about 40° C. but above the point (about 34.7° C.) at which sodium cyanide dihydrate ($NaCN \cdot 2H_2O$) crystals form; and reacting the liquid stream with not more hydrocyanic acid than will, on neutralizing the sodium hydroxide raise the temperature of the liquid above about 50° C. Both the alkali concentration and the 50° C. temperature are critical limitations of this process. If the temperature rises above 50° C., the conversion of cyanide to formate increases rapidly with concomitant loss in yield. Polymerization is also accelerated by increased temperatures. The production of sodium cyanide by the cyclic, continuous, quick intermixture of hydrogen cyanide with a continuous flow of an aqueous solution containing both sodium cyanide and sodium hydroxide may be accomplished in a single stage or in multiple stages but preferably in one or two stages. But in any event there will be continuous recirculation of a major portion of the cyanide-caustic solution since only a fraction of the sodium cyanide of the final sodium cyanide solution desired can be produced by a single pass of the solution into intermixture with hydrocyanic acid in order to avoid heating the mixture above about 50° C. Accordingly, the major portion of the partially neutralized solution, after cooling to about 35 to 40° C., is reconstituted by the addition of sodium hydroxide and, if necessary, water, and is then again ready for quick intermixture with hydrogen cyanide gas. A minor portion of the cyanide solution coming from the intermixture with the hydrogren cyanide is withdrawn for further processing, either to obtain directly the final solid cyanide by evaporation, crystallization, filtration and drying or by further reducing the caustic content in a succeeding stage by reacting with another stream of hydrogen cyanide gas but in such succeeding stage also observing the critical requirement of preventing the temperature from rising above about 50° C. and maintaining a minimum of about 0.2% by weight of sodium hydroxide in the solution at all times. Details of the process may be understood from the remainder of this specification and from the drawing, incorporated herein by reference, in which:

The figure shows diagrammatically the apparatus that may be employed and the flow of chemicals between the various pieces of apparatus. Darker lines indicate primary direction of flow through the system, from raw material to finished cyanide solution.

In the drawing, liquid hydrogen cyanide usually containing 1–10% water and 0.01% sulfuric acid is shown entering the system through line 1. The liquid passes into vaporizer 2 where it is heated to a temperature slightly above its boiling point. A small amount, about 0.01%, of gaseous sulfur dioxide also may be fed into the vaporizer through line 2 as a vapor phase stabilizer to inhibit polymerization of gaseous hydrogen cyanide. Generally the water present in the liquid hydrogen cyanide is vaporized with the latter unless a fractionating column is provided. Some of the water however may condense and be purged along with mineral acid from the bottom of the vaporizer through line 4.

Effluent gases, largely hydrogen cyanide but containing a very small percentage of sulfur dioxide and acid, leave the vaporizer through line 5 and are conducted into superheater 6. In superheater 6 the temperature of the gases is raised to about 40° C. to insure that no vapor condenses in subsequent lines and jet mixers. Condensation in the lines may cause polymerization of hydrogen cyanide particularly at the jets and plug up the system. Gases leave superheater 6 through line 7, which divides into lines 8 and 12, and through lines 8 and 12 to surge tanks 9 and 13 respectively. The surge tanks are essentially safety devices of relatively large volume placed in the system to prevent flow of caustic liquor back to the vaporizer. Such a flow would cause a violent reaction with and polymerization of the hydrocyanic acid and result in possible rupture of the vaporizer. Nine-tenths of the gases are fed through line 8, tank 9 and line 10 into primary jet 11. The remaining one-tenth of the gases travels through line 12, tank 13 and line 14 into finisher jet 15.

The major part of the neutralization of this reaction, when operating in two stages as illustrated by the drawing, i. e., about 90%, occurs at primary jet 11 where all of the caustic fed to the system and most of the hydrogen cyanide introduced meet. Sodium hydroxide for the reaction enters at line 16 and may be a solution of about 30–40% or higher concentration. Line 16 leads the sodium hydroxide solution into recycle tank 17 and there it is mixed with sodium cyanide solution, entering the recycle tank through line 27 from cooler 25 to form a mixture in said tank 17 containing about 3–6% caustic and 30–35% cyanide. This mixture is forced to jet 11 through lines 18 and 20 by pump 19. Jet 11 is a venturi type gas scrubber of conventional construction. The caustic mixture is sprayed in at the top of the jet and absorbs hydrogen cyanide entering at the side through line 10. Absorption of the gas is complete and rapid, the temperature of the product being raised to about 50° C. The temperatures of both the hydrogen cyanide and caustic streams entering the jet are preferably not greater than 40° C. Since in the case of the two stage process only about 90% of the total hydrogen cyanide is introduced at the jet 11, the product is quite alkaline and the formation of by-products such as formates and carbonates is minimized. Maintenance of excess alkalinity in the solution at this point is important and necessary if sodium cyanide of requisite quality is to be obtained.

The sodium cyanide solution still alkaline, produced in jet 11 drops into tank 21 which may be immediately underneath and attached to the jet. This solution may contain about 30 to 37% by weight of sodium cyanide and at least 0.2% and up to about 3 to 5% by weight of sodium hydroxide. Tank 21 serves to seal pump 23, to which it is connected through line 22, and thereby prevents loss of prime. A visual indicator (not shown) may be provided in tank 21. The cyanide solution passes through tank 21, line 22, pump 23 and line 24 to cooler 25. Cooler 25 brings the temperature of the solution back to or below 40° C. but not below about 35° C. Even with the high alkalinity maintained, side reactions are likely to occur at temperatures greater than 40° C. and therefore cooling should be carried out as rapidly as possible. The sodium cyanide solution in the cooler is, however, fairly concentrated and preferably should not be cooled below about 34.7° C. At this latter temperature sodium cyanide dihydrate may crystallize out and plug the piping and eventually force a shut-down of the equipment since the process will operate smoothly only if there is substantial absence of solids, especially crystallizing solids in the system.

Cooled cyanide solution is forced out of cooler 25 into line 26 and is divided between lines 27 and 28. A major part of the stream, up to about 90%, flows through line 27 into the tank 17 for recycle to the jet 11 after enrichment with additional caustic. Line 28 conducts about 10% of the cyanide solution into a finisher recycle tank 29 which serves as a reservoir collecting reaction liquor, mixes it with about one-half to five-sixths of the circulating liquor from finisher jet 15 and supplies a backlog of feed through line 30 for pump 31. Through line 32 the liquor proceeds to cooler 33 where its temperature is fixed at about 35–40° C. before it passes through line 34 to finisher jet 15. In this jet 15 the alkaline cyanide solution is sprayed into the remaining 10% unreacted hydrogen cyanide from line 12 and the solution caustic content is thereby brought down to not less than about 0.2% by weight. If polymerization and discolored products are to be avoided, the hydroxide concentration cannot be permitted to fall much below the 0.2% level. Since relatively slight reaction takes place at this jet, the temperature does not rise unduly, not above about 50° C. in any event, and some of the liquor can be transmitted directly through line 36, pump 37 and line 38 to evaporators, crystallizers, filters and driers where substantially pure sodium cyanide is obtained. Line 39 continually recycles most of the product liquor from line 36 back to tank 29. The solution thus returned to tank 29 reduces the caustic content thereof and provides a fine control for the system.

Recycle tank 17 serves primarily as a mixing vessel and intermediate storage reservoir for caustic cyanide solution. Sodium hydroxide solution of e. g. 40% strength is introduced through line 16 and diluted in tank 17 with the accumulated and largely recycled sodium cyanide solution. Addition of water entering from line 40 may be made to control the total solids concentration in the recycling solution. The caustic concentration must not be allowed to rise much above about 6% and sodium cyanide above about 33 to 36%, all percentages by weight, if precipitation and plugging up of the system is to be avoided in subsequent steps. The temperature of the cyanide caustic solution preferably should be regulated at about 35 to 40° C. All of the mixture in the recycle tank 17 is forced, as described above, through lines 18 and 20 and pump 19 into primary jet 11 to react with hydrogen cyanide.

It will be seen that careful control of temperature and concentrations is the basis of this invention permitting for the first time the commercial manufacture of high quality sodium cyanide by means of a wet process. The jets utilized are important elements in the control system since they induce rapid and complete reaction and avoid local excesses of hydrogen cyanide. Fine control is however obtained by the use of two reaction stages. About 90% of the reaction is carried out in a first stage. The product of the first stage is alkaline and is cooled below about 50° C. and thus avoids polymerization of hydrogen cyanide. If excess hydrogen cyanide were permitted at a temperature of 50° C., polymerization would be almost certain. Only about 10% of the reaction is carried out in the second or finisher stage. The temperature of the reaction mixture is thus not raised unduly above the preferred 35 to 40° C. working temperature. A safe caustic level of at least 0.2% and preferably 0.5% by weight is however maintained even in the finisher stage. Obviously a third or even additional stages may be added to the system described but such stages are unnecessary and, for economic reasons, not particularly desirable.

If desired, the process may be operated as a single stage with, for example, only one venturi jet absorber. Thus, as illustrated in the drawing, sodium hydroxide will be fed through pipe 16 into recycle tank 17 in which it will be mixed with previously formed sodium cyanide and water from pipe 40 if needed. The concentration of sodium hydroxide will be between about 0.5 to 4.5% by weight and preferably between 2 to 4%, and the sodium cyanide between about 30 to 37% by weight. This mixture at a temperature between about 35° and 40° C. will be cycled through jet absorber 11 where it will react with all the hydrogen cyanide fed to the system, but the rate of feed of hydrogen cyanide will be such that the temperature of the reaction mixture leaving the jet or absorption mixer will not rise above about 50° C., and the resulting cyanide solution will contain at least 0.2% residual sodium hydroxide. The reacted mixture or solution will enter seal tank 21 and then be forced through cooler 25 where the temperature of the liquid mixture will be reduced to between about 35 and 40° C. On leaving the cooler the solution will contain about 37% sodium cyanide and at least between about 0.2 to 0.5% by weight of free or unreacted sodium hydroxide. The reacted solution may contain more or less than 37% sodium cyanide but it will contain not as much as to result in the precipitation of either solid sodium cyanide or the dihydrate of sodium cyanide. This solution will leave by way of pipe 26 and be divided so that the major portion, over 60% and preferably up to about 90% will be returned by way of line 27 to the recycle tank 17 to be reconstituted by repeating the process of addition of sodium hydroxide and the recycle to the jet absorber 11. The minor portion, less than about 40% and preferably about 10% of the stream of cyanide solution from cooler 25 will leave the system by way of line 28 and is ready for passage to evaporators, crystallizers, filters and driers whereby substantially pure solid sodium cyanide is obtainable.

When starting the process it is of course possible to start with only caustic solution in tank 17. However, this caustic solution will be cycled through the jet absorber 11 and hydrogen cyanide added to it at such a rate in the jet that the temperature of the partially neutralized solution leaving the jet and entering cooler 25 will not rise above about 50° C. As the process continues the concentration of alkali metal cyanide in tank 17 will gradually increase until the concentration reaches the point when a solution of the desired concentration of caustic, i. e., not less than about 0.2% and on up to several percent, depending upon whether one or more stages of neutralization are employed. In this mode of operation caustic will generally not be added to the recycle tank 17 until the desired concentration range of metal cyanide in the solution has been reached at which point the process may then become completely continuous as described above or the product may be removed from tank 17 as a batch product.

The following example will serve to illustrate the practice of this invention. Liquid hydrogen cyanide at the rate of 1 part per hour, 50% caustic soda at the rate of about 2.8 parts per hour and the requisite dilution water were passed into the system described. About 1.7 parts per hour of white finished product were withdrawn continuously from the driers. Product analysis showed 97.34% sodium cyanide, 0.10% water, 0.32% sodium hydroxide, 1.16% sodium carbonate, 0.48% sodium formate, 0.10 sodium chloride and 0.0167 sulfur as such.

Some deviation from the exact procedure described will be evident to those skilled in the art. Other absorbers which give very rapid and complete mixing may, for example, be substituted for the jets. Any absorber substituted must, however, permit the avoidance of local excesses of hydrocyanic acid. Furthermore, as noted, additional finisher stages may be added at will. Still further, the chemicals utilized in this process need not be exactly those specified. Anhydrous hydrogen cyanide or the effluent gases produced by the method of Andrussow may be substituted for the water-containing gas shown. Finally, this process is not restricted in application to the manufacture of sodium cyanide alone. It can be used to produce other alkali cyanides such as that of potassium.

I claim:
1. The cyclic process for producing an alkali metal cyanide by the neutralization of an aqueous alkali metal hydroxide with hydrogen cyanide comprising quickly intermixing a continuous stream of hydrogen cyanide gas with a continuous stream of an aqueous solution containing a major portion of dissolved alkali metal cyanide and a minor portion of dissolved alkali metal hydroxide, said hydrogen cyanide being intermixed at a rate such that the heat of neutralization will not increase the temperature of said aqueous solution above about 50° C. and the amount of dissolved alkali metal hydroxide will be in excess by at least about 0.2% by weight of that required for the neutralization of said admixed hydrogen cyanide, thereafter cooling said solution to about 35 to 40° C. and dividing said cooled solution into two unequal parts, removing the smaller of said parts for separation and recovery of the alkali metal cyanide product and adding alkali metal hydroxide to the larger part of said cooled solution to reconstitute said aqueous solution containing a major portion of dissolved alkali metal cyanide and a minor portion of dissolved alkali metal hydroxide and recycling said reconstituted solution for quick intermixing with hydrogen cyanide gas as before and repeating the cycle.

2. The process of claim 1 wherein the alkali metal is sodium.

3. The process of claim 1 wherein the alkali metal is potassium.

4. In the process for manufacturing alkali metal cyanides as aqueous solutions and as solid products which involves neutralization of an aqueous alkali metal hydroxide solution with hydrogen cyanide, the improvement of feeding a continuous stream of an aqueous solution containing a major portion of dissolved alkali metal cyanide and a minor portion of dissolved alkali metal hydroxide for neutralization with hydrogen cyanide, regulating the temperature of said continuous feed stream to be at least 35° C. and less than 50° C., quickly intermixing a continuous stream of hydrogen cyanide gas with said aqueous solution stream at a rate which will not increase the temperature of said solution above about 50° C. and which will leave at least about 0.2% by weight of alkali metal hydroxide in the solution resulting from neutralization of said hydrogen cyanide, continuously recirculating to said continuous feed stream a major part of said resulting solution, adding alkali metal hydroxide to said recycled solution to reconstitute said feed stream for repeating the cycle of quick intermixing with hydrogen cyanide gas, and continuously separating a minor part of said resulting solution from solution remaining in the process to provide alkali metal cyanide product by a continuous cyclic process.

5. The process of claim 4 wherein the alkali metal is sodium.

6. The process of claim 4 wherein the alkali metal is potassium.

References Cited in the file of this patent
UNITED STATES PATENTS

| | | |
|---|---|---|
| 1,531,123 | Mittasch et al. | Mar. 24, 1925 |
| 2,616,782 | Cain et al. | Nov. 4, 1952 |
| 2,708,151 | McMinn | May 10, 1955 |
| 2,726,139 | Oliver | Dec. 6, 1955 |
| 2,742,344 | Inman | Apr. 17, 1956 |